United States Patent [19]

Karlsson

[11] 4,320,575
[45] Mar. 23, 1982

[54] APPARATUS FOR MANUFACTURING CANDLES

[76] Inventor: Lars H. Karlsson, Köpmansgatan 17, 82060 Delsbo, Sweden

[21] Appl. No.: 139,183

[22] Filed: Apr. 11, 1980

Related U.S. Application Data

[62] Division of Ser. No. 955,613, Oct. 30, 1978, abandoned.

[51] Int. Cl.³ .................. B23P 21/00; B23P 19/00
[52] U.S. Cl. .......................... 29/788; 29/241; 29/786; 29/793; 29/796; 425/803
[58] Field of Search ............. 29/241, 252, 254, 281.5, 29/771, 779, 788, 796, 782, 793, 794, 783, 786; 92/110; 227/112, 156; 425/803

[56] References Cited

U.S. PATENT DOCUMENTS

| 1,390,257 | 9/1921 | Dillman | 425/803 |
| 1,786,634 | 12/1930 | Sgritta | 425/803 |
| 3,263,929 | 8/1966 | Seablom | 92/110 |
| 3,473,328 | 10/1969 | Mayhew | 92/110 |
| 3,541,973 | 11/1970 | Aquarius | 425/112 X |
| 3,581,378 | 6/1971 | Jozens | 29/788 X |
| 3,882,760 | 5/1975 | Pass | 92/110 |
| 3,907,487 | 9/1975 | Reiher | 29/241 X |
| 3,958,909 | 5/1976 | Estrugo | 425/803 X |

FOREIGN PATENT DOCUMENTS 1930568 2/1971 Fed. Rep. of Germany ...... 425/803

*Primary Examiner*—Ervin M. Combs
*Attorney, Agent, or Firm*—Birch, Stewart, Kolasch & Birch

[57] ABSTRACT

The present invention relates to an apparatus intended for use in manufacturing candles of a type comprising an open container with candle wax composition, wick and wick holder. The invention is particularly related to wick advancing means and mating means in an apparatus for manufacturing such candles.

8 Claims, 3 Drawing Figures

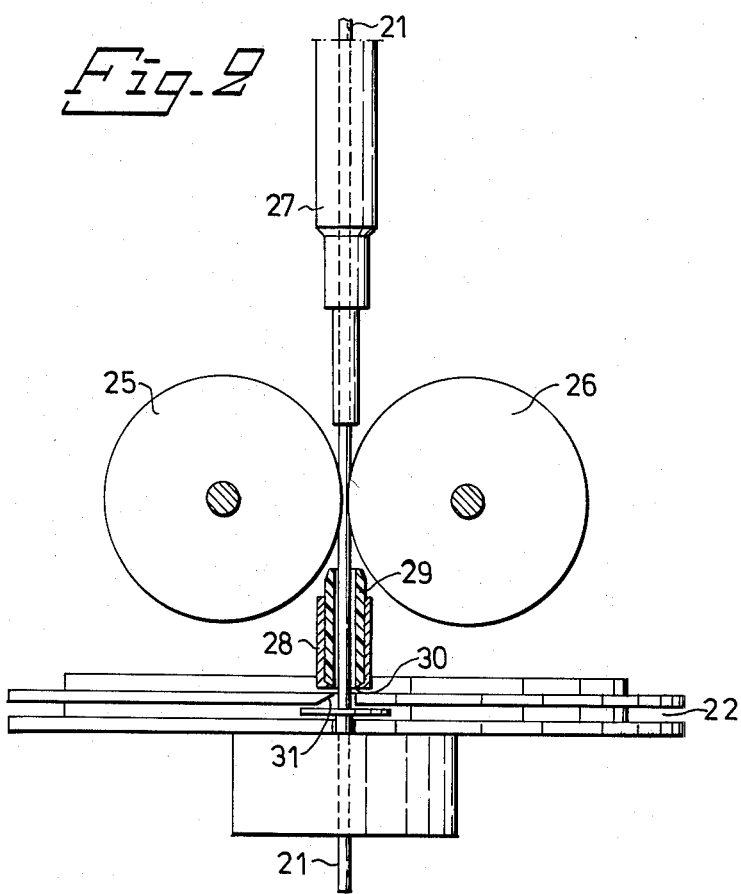
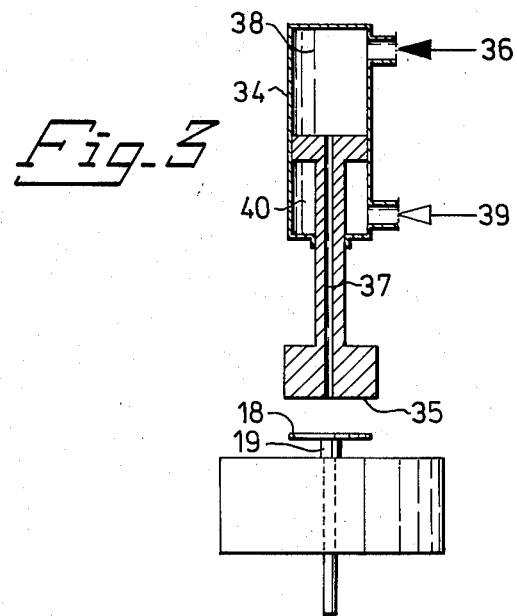

APPARATUS FOR MANUFACTURING CANDLES

This application is a divisional, of copending application Ser. No. 955,613, filed on Oct. 30, 1978, abandoned.

BACKGROUND OF THE INVENTION

Candles comprising an open cylindrical metal container filled with candle wax material, a wick extending through the center of the wax material and a metallic wick holder at the bottom of the container are well known in the art. Such candles are sometimes called heating candles because they are often used for heating purposes as well as lighting purposes.

According to one method of manufacturing substantially cylindrical heating candles, the candle wax composition is pressed into substantially cylindrical discs with a central hole. The discs are advanced in turn to a wick feeding means. In addition, wick holders with holes for the wick are delivered in turn to the wick feeding means. The means feeds wick yarn from a reel, first through a wick holder and thereafter through a hole in a disc of candle wax composition, so that the wick protrudes a predetermined distance from the hole on the other side of the disc. The wick feeding means then cuts off the wick on the side of the wick holder facing away from the hole in the disc. The hole in the wick holder for the wick is usually arranged in a neck portion which is compressed by a compressing device after the wick has been cut off, so that it extends through the wick holder and wax disc. The wick holder is subsequently mated with the wax disc so that they are in abutment with each other. The wax with wick and wick holder are finally placed in a substantially cylindrical container.

In previously known apparatus working in the way described above, problems sometimes occur with the means mating the wick holder with the wax so that they are in abutment with each other. For the two parts to mate properly it is desirable for the neck portion to be thrust into the hole in the wax. The problems which develop are usually that the wick holder is not mated with the wax so that there is a lasting engagement between them, or so that the wick holder is taken into abutment with the wax in an excentric position relative to the hole in the wax.

Sometimes there are other problems with the mating means of the previously known apparatus of the type described above. These problems usually are concerned with the cutting means which may quickly wear and the wick advance does not take place satisfactorily, or wherein the wick advance does not initially perform satisfactorily.

SUMMARY OF THE INVENTION

The object of the present invention is to solve the problems with the wick advancing means and mating means in a candle manufacturing apparatus working substantially in the way described above. Through the invention there is achieved an accurate and operationally reliable advance and cut-off of the wick yarn, as well as a secure mating of the wick support and candle wax composition into abutment against each other with the neck portion in or up against the hole in the wax.

According to the present invention mating means for mating the wick holder with the wax in abutment with each other when the wick extends through the neck portion and hole in the wax comprises a compressed air-operated piston device. The piston device has a front surface arranged to take the wick holder into abutment against the wax when the piston device is actuated by compressed air from a compressed air source. The piston device further has a compressed air channel arranged to direct a jet of air against the wick holder in a direction towards the wax when the piston means is actuated by compressed air for taking the wick holder into abutment against the candle wax composition.

According to an embodiment of the invention the compressed air duct opens out centrally in the front surface and is arranged to direct the jet of air in a direction towards the hole in the wax composition.

According to a preferred embodiment of the invention the air channel has the shape of a boring extending from the middle of the front surface through the piston device into a chamber supplied with compressed air when the piston device is actuated to mate the holder and the disc of wax composition so that they abut each other. By using the chamber necessary for moving the piston device also for supplying air to the air channel requires no separate control means for the air supply to the duct.

BRIEF DESCRIPTION OF THE DRAWINGS

Specific embodiments of the invention will now be described by way of example with reference to the Figures of the accompanying drawings wherein elements which are not essential for the understanding of the invention have been omitted for the sake of clarity and in which:

FIG. 2 shows a section through a portion of the wick advancing means in an apparatus in accordance with FIG. 1.

FIG. 3 shows a section through a portion of the mating means in an apparatus in accordance with FIG. 1.

DETAILED DESCRIPTION OF PREFERRED EMBODIMENTS

Figure 1:
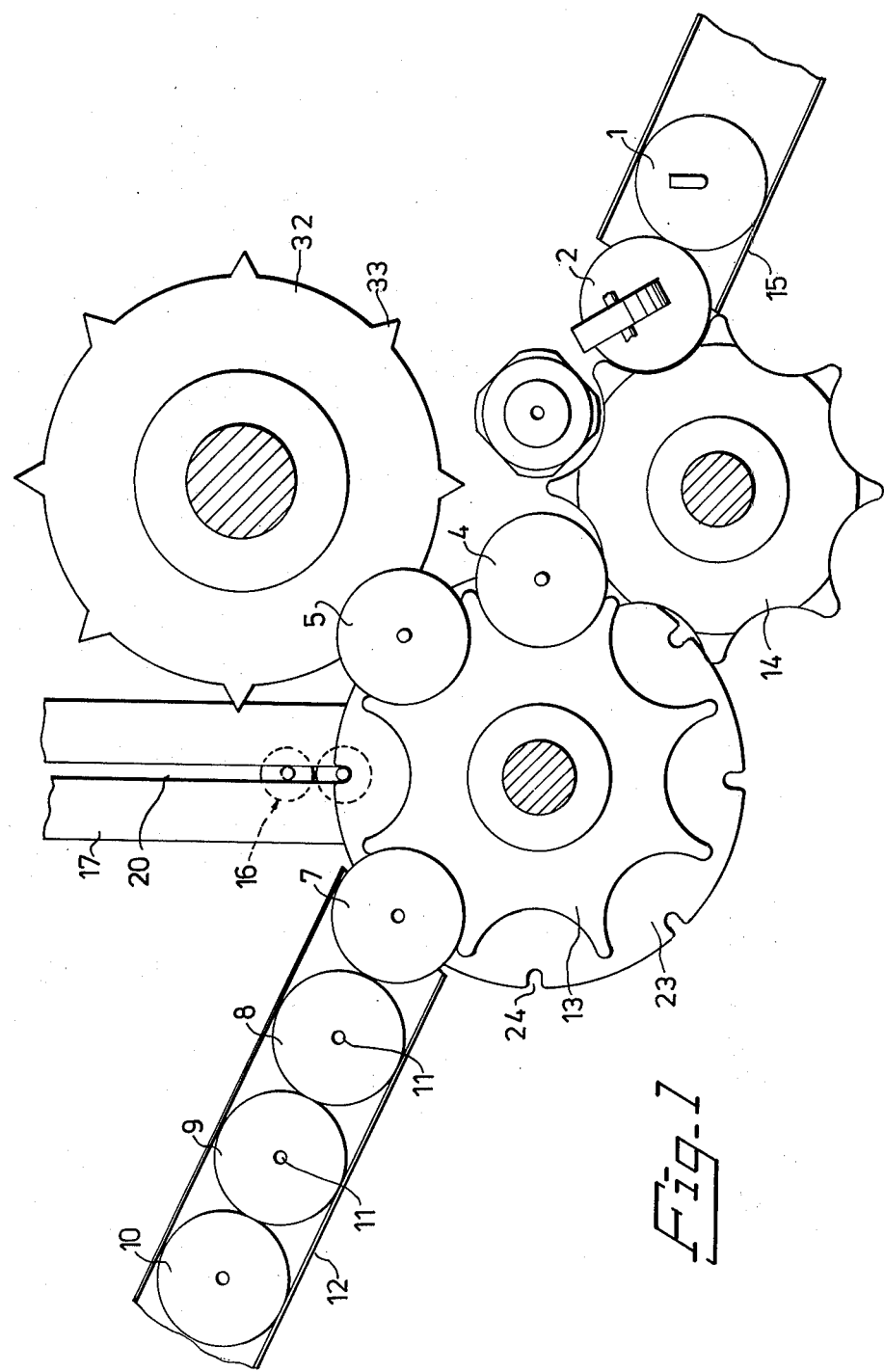
FIG. 1 shows a view from the front of a portion of an apparatus for manufacturing candles in the form of an open container accommodating candle wax composition, wick and wick holder.

In the figures, the numerals 1–10 denote candle wax composition which has been pressed into cylindrical discs with axial through holes 11. The discs 3 and 6 are not drawn in FIG. 1, so that other parts shall be visible. Pressing can be carried out in a way known per se in a press known per se, and should therefore not require any further description in this connection.

The candle wax composition pressed to cylindrical discs is taken from the press or a temporary storage by means known per se, of which a part is indicated in FIG. 1 by the guide chute 12. From guide chute 12 the discs are collected one at a time by a first feed wheel 13.

The first feed wheel describes an intermittent clockwise rotary movement, thereby moving the discs in turn from the position held by disc 7, via the positions held by discs 6, 5 to the position held by disc 4.

Another feed wheel 14 also describes an intermittent clockwise rotary movement, synchronized with that of the first feed wheel. The second feed wheel coacts with the first feed wheel to move the discs in turn from the position occupied by the disc 4 via the position occupied by disc 3, this disc only being shown in FIG. 2, to the position occupied by disc 2. The discs leave the portion of the apparatus shown in FIG. 1 via conveying means known per se of which a portion is indicated by the character 15.

Wick holders 16 are taken in turn via a supply means 17 to the portion of an apparatus shown in FIG. 1 for manufacturing candles. As is best apparent from FIGS. 2 and 3, the wick holders have a substantially disc-shaped base portion 18 and a centrally placed neck portion 19, projecting from the base portion. The base and neck portions 18, 19 include a hole projecting therethrough. To guide the movement of the neck portions in the supply means, the latter has a groove 20 coacting with said portions. The wick holders are of a kind known per se, and neither they nor the supply means ought to need any further description.

The wick advancing means partially shown in FIG. 2 advances wick yarn 21 in an intermittent movement from a supply reel (not shown) through the hole in the neck portion of a wick holder and through the axial through hole in the wax disc 6, until the wick extends a predetermined distance from the mouth of the hole. As is apparent from FIG. 2, the forward feed takes place while the wick holder is in a retaining groove 22 in the rear wall 23 of the first feed wheel. Further to the groove 22, the rear wall 23 also has recesses 24 for the neck portions of the wick holders.

The force required for advancing the wick is provided by two driven rollers 25 and 26. The rollers pull the wick from the supply reel (not shown) via a guide tube 27 and press the wick through a silver steel nozzle 28, lined with a piece of plastics material 29 with the trade name of "Robalon".

The part of the nozzle nearest to the rear wall 23 of the first feed wheel is formed with a first cutting edge 30 for coaction with a second edge 31 on the rear wall to cut off the wick behind the base portion of the holder when the first feed wheel turns clockwise from the position shown in the figure. The cut wick then extends from one side of the base portion of the holder through the neck portion of the holder and through the axial hole in the disc which is illustrated in FIG. 1 as disc 5 of candle wax composition, and out a distance from the mouth of the hole on the side of the disc facing away from the holder. During the advance of the wick and the cutting of the wick, the wick holder is in the holder groove 22 and the neck portion 19 is in the recess 24. Thus the base portion of the holder does not lie against the disc, but is at a certain small distance away from it.

In order to fix the wick relative to the holder after cutting the wick off, the neck portion of the holder is compressed by a compressing means when the wax disc is in the position taken up by the disc 5 in FIG. 1. The compression means comprises a compressing wheel 32, which describes an intermittent clockwise rotary movement synchronized with the rotary movement of the first feed wheel. The compression itself is carried out by compression teeth 33, which press the neck portion of a wick holder, one at a time, when the neck of the holder is accommodated in one of the recesses 24 in the rear edge of the first feed wheel. The recess 24 thus acts as a support means during the compressing operation.

When a wax disc has been moved by the second feed wheel from the position taken up by disc 4 to the position held by disc 3 in FIG. 1, the wick extends through the axial hole in the disc and through the neck portion of the wick holder where it is fixed due to the compression of this portion. The base portion of the holder is still not in abutment with the disc, but is at substantially the same distance relative to the disc as the distance described earlier with respect to the positions taken up by the discs 4, 5 and 6 in FIG. 1. Before the disc with wick and wick holder is placed in the open container, the wick holder must be mated with the disc so that they are in abutment with each other. For this purpose there is a mating means, which is most clearly illustrated by FIG. 3.

The mating means comprises a compressed air operated piston device 34 with a front surface 35 arranged, in coaction with a holding-up means (not shown), to aid in the positioning of the holder into abutment against the disc when the piston device is actuated by compressed air supplied at the filled-in arrow 36. The piston device has a compressed air duct 37 adapted for directing an air stream against the wick holder in a direction towards the disc when the piston device is actuated by compressed air supplied at the filled-in arrow 36, to actually displace the holder into abutment against the disc. For this purpose the compressed air duct extends from the middle of the front surface 35 through the length of the piston rod of the piston device to the chamber 38, supplied with compressed air at the arrow 36 when the piston device is actuated on to mate the holder and the disc so that they abut each other. The compressed air duct and piston device are otherwise so orientated and located that the air stream from the duct would meet the hole in the disc if the holder was not positioned therein. Due to the inertia in the piston device, the air stream from the compressed air duct will actuate the holder before the front surface of the piston device has time to move so far that it comes into contact with the base portion of the holder. The air stream from the compressed air duct 37 is so strong that it can move the holder, with attached wick, and has time to provide a certain amount of centering of the wick holder and its neck portion relative to the axial through hole in the disc, before the front surface has time to exercise any force of importance on the holder in the direction of its movement. The compressed air duct therefore provides improved centering during mating of the holder and disc. Due to the compressability and inertia of air in the system, the air in the compressed air duct also contributes to obtaining a good and positive release of the holder base portion from the front surface when the compressed air piston device is caused to return, by means of compressed air via the open arrow 39, to the return chamber 40, after having mated the holder and the disc. The cross-sectional surface of the compressed air duct must be dimensioned with regard to the compressed air pressure used, as well as the inertia and stroke etc of the piston device, so that said effects are achieved.

In the manufacture of heating candles where the cylindrical discs have a diameter of about 35 mm and a height of about 15 mm, good results have been obtained with a compressed air piston with an operating area of about 30–32 mm diameter, and a borehole constituting a compressed air duct through the piston with a borehole diameter of about 0.7–1 mm for an actuating compressed air operating pressure of about 1.5–2 kg.

After the holder and disc have been mated when in the position taken by the disc 3, the disc is moved by the second feed wheel to the position taken up by disc 2. During the later part of this movement and possibly in the latter position, the portion of the wick projecting from the mouth of the hole is bent in towards the surface of the disc. Since the wick is relatively stiff due to impregnation, it remains in a bent position and contributes to fixing the holder relative to the disc, especially when the hole is on the big side relative to the compressed neck portion of the holder.

After the wick has been bent and the disc with wick and wick holder have been moved to the position taken up by disc 1 in FIG. 1, it is taken further to a device which sinks it down into an open empty container. The device which puts it into the container can be of a type known per se and ought therefore not to require further description in this connection.

The apparatus described above is naturally only to be regarded as an embodiment of the invention. For example, the piston means for mating the wick holder and the body of candle wax composition can naturally also be used in conjunction with a somewhat different apparatus for wick advancing and cutting off the wick yarn than those shown in FIGS. 1 and 2. On the other hand, the wick advancing means shown in FIGS. 1 and 2 can naturally be used in conjunction with somewhat different mating means than those shown in FIGS. 1 and 3.

The surfaces of the discs facing away from the wick holder do not need to be completely flat but it is an advantage if their sides facing towards the holder are flat. In manufacturing heating candles with an apparatus according to the invention, candle wax composition known per se can be used. It should therefore not be necessary to specify its chemical composition here. For similar reasons, it is not necessary to specify usable material for the wick and container.

Instead of one single central compressed air duct from the front surface through the piston rod of the piston device to the chamber 38, it is conceivable in principle to have two or more symmetrically placed ducts. Instead of having a compressed air duct through the piston device, it is in principle conceivable to have two or more compressed air ducts which do not go through the front surface. For example, one or more hoses provided with jets and connected to the same compressed air source supplying compressed air to the chamber 38 can be used to provide a suitable jet-fair with sufficient force on the wick holder. A single duct opening out centrally in the front surface is to be preferred, however.

Further variations and modifications of the described embodiment are possible within the scope of the patent claims. For example, instead of silver steel, some other material with suitable hardness, cutting capacity, resistance to corrosion and wearing strength can be used. Similary, the nozzle can be possibly lined with a piece of some other plastics material than Robalon, poviding that it has the same ability to prevent the occurrence of such problems with the advance of the wick yarn as are caused by the wick yarn impregnation.

It is believed that a compressed air operated piston device with a front surface, first and second chambers, and an air duct as described might be used in other apparatus than apparatus in manufacturing of candles as described.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

It is claimed:

1. An apparatus for manufacturing heating candles having a candle wax composition, a wick and a wick holder with a hole in a neck portion thereof, said apparatus including a wick advancing means for supplying wick yarn through the hole in the neck portion of the wick holder to form a wick holder and wick assembly and for supplying yarn through a hole through the candle wax composition, and mating means for mating the wick holder and wick assembly with the candle wax composition into abutment with each other after the wick is positioned to extend through the neck portion and the hole in the candle wax composition, said mating means comprising:

a compressed air-operated piston device with a front surface arranged to aid in the positioning of the wick holder and wick assembly into abutment against the candle wax composition when the piston device is actuated by compressed air from a compressed air source;

said piston device including a compressed air duct operatively arranged to direct a jet of air against the wick holder and wick assembly in a direction towards the candle wax composition when the piston device is actuated by compressed air, said jet of air being of a predetermined force to displace the wick holder and wick assembly into abutment against the candle wax composition.

2. An apparatus according to claim 1, wherein the compressed air duct opens centrally in the front surface of said piston device, and is arranged to direct the jet of air in a direction towards the hole in the candle wax composition.

3. An apparatus according to claim 1, wherein said wick advancing means includes at least one drive roller means for successively supplying a predetermined quantity of wick yarn through the hole in the neck portion of the wick holder and a hole through the candle wax composition as individual wick holders and candle wax compositions are successively, operatively positioned relative to said wick advancing means.

4. An apparatus according to claim 1, and further including a compression means for crimping the neck portion of the wick holder to retain a wick in the hole projecting through the neck portion to form said wick holder and wick assembly prior to the displacement of the wick holder and wick assembly into abutment against the candle wax composition.

5. An apparatus according to claim 1, wherein said piston device includes two compressed air ports, a first air port for supplying compressed air to said piston device for directing a jet of air against the wick holder and wick assembly to actually displace the wick holder and wick assembly into abutment against the candle wax composition and for actuating the piston device to move a predetermined distance towards the wick holder and wick assembly and the candle wax composition and a second air port for successively displacing the piston device away from the wick holder and wick assembly and the candle wax composition after the wick holder and wick assembly abuts against the candle wax composition.

6. An apparatus according to claim 1, wherein said wick extends a predetermined distance through said hole in said candle wax composition and projects outwardly therefrom, and bending means are provided for bending a portion of the wick extending from the candle wax composition after the wick holder and wick assembly is displaced into abutment against the candle wax composition.

7. An apparatus according to claim 1, wherein said candle wax compositions are successively supplied to an intermittently rotating feed wheel operatively arranged with a supply of wick holders and said wick advancing means, said feed wheel including a plurality of candle wax composition stations and wick holder stations for successively aligning said hole in the neck portion of said wick holder and the hole in the candle wax composition so that the wick yarn may be advanced through the hole in the neck portion of wick holder to form said wick holder and wick assemblies and to supply wick yarn through the hole in the candle wax composition with each intermittent advance of said feed wheel.

8. An apparatus according to claim 7, wherein said wick yarn is advanced by said wick advancing means a predetermined distance into said hole in the neck portion of said wick holder and said hole in said candle wax composition and is severed with each intermittent advance of said feed wheel.

* * * * *

UNITED STATES PATENT AND TRADEMARK OFFICE
CERTIFICATE OF CORRECTION

PATENT NO. : 4,320,575
DATED : March 23, 1982
INVENTOR(S) : Karlsson

It is certified that error appears in the above—identified patent and that said Letters Patent is hereby corrected as shown below:

On the title page,
after the category entitled "Related U.S. Application Data", insert the following category:

--- [30] Foreign Application Priority Data

Nov. 1, 1977   Sweden   ..............   7712347   --

Signed and Sealed this

*Fifteenth* Day of *June 1982*

[SEAL]

Attest:

Attesting Officer

GERALD J. MOSSINGHOFF
*Commissioner of Patents and Trademarks*